United States Patent [19]
Britt, Jr. et al.

[11] Patent Number: 5,940,074
[45] Date of Patent: Aug. 17, 1999

[54] REMOTE UPGRADE OF SOFTWARE OVER A NETWORK

[75] Inventors: Joe F. Britt, Jr., Saratoga; Andrew T. McFadden, Cupertino; Phillip Y. Goldman, Los Altos; Bruce A. Leak, Palo Alto, all of Calif.

[73] Assignee: WebTV Networks, Inc., Mountain View, Calif.

[21] Appl. No.: 08/755,238

[22] Filed: Nov. 22, 1996

Related U.S. Application Data

[63] Continuation-in-part of application No. 08/660,088, Jun. 3, 1996, and a continuation-in-part of application No. 08/656,924, Jun. 3, 1996.

[51] Int. Cl.[6] .................................................. G06F 15/163
[52] U.S. Cl. ............................................ 345/333; 345/352
[58] Field of Search ................................... 345/326, 327, 345/328, 329, 330, 331, 332, 333, 334, 335, 336, 337, 338, 339, 340, 341, 342, 343, 344, 345, 346, 347, 348, 349, 350, 351, 352, 353, 354, 156; 395/200.48, 200.36

[56] References Cited

U.S. PATENT DOCUMENTS

| | | | |
|---|---|---|---|
| 5,325,423 | 6/1994 | Lewis | 379/90 |
| 5,488,411 | 1/1996 | Lewis | 348/8 |
| 5,538,255 | 7/1996 | Barker | 463/41 |
| 5,558,339 | 9/1996 | Perlman | 463/42 |
| 5,564,001 | 10/1996 | Lewis | 395/154 |
| 5,586,257 | 12/1996 | Perlman | 463/42 |
| 5,612,730 | 3/1997 | Lewis | 348/8 |
| 5,657,448 | 8/1997 | Wadsworth et al. | 395/200.5 |
| 5,680,645 | 10/1997 | Russell et al. | 395/868 |
| 5,696,899 | 12/1997 | Kalwitz | 395/200.1 |
| 5,706,434 | 1/1998 | Kreman et al. | 395/200.04 |
| 5,706,502 | 1/1998 | Foley et al. | 395/610 |
| 5,748,896 | 5/1998 | Daly et al. | 395/200.53 |

OTHER PUBLICATIONS 2.0, Netscape Communications Corporation, pp. 19–20, 1996.

Chankhunthod, Anawat et al., "A Hierarchical Internet Object Cache," 1996 USEWIX Technical Conference (6 pages).

*Primary Examiner*—Steven P. Sax
*Attorney, Agent, or Firm*—Workman Nydegger & Seeley

[57] ABSTRACT

A World Wide Web browser software is implemented in a processing system housed in a set-top box connected to a television and communicating over a wide-area network with one or more servers. The browser software allows a user to navigate using a remote control through World-Wide Web pages in which a number of hypertext anchors are displayed on the television. User inputs are entered from a remote input device using an infrared (IR) link. The processing system includes a read-only memory (ROM) and a flash memory. The mask ROM and the flash memory are assigned adjacent memory spaces in the memory map of the processing system. Browser software and configuration data are stored in the flash memory. Other software and configuration data are stored in a mask ROM. The browser is upgraded or reconfigured by downloading to the box replacement software or data transmitted from a server over the network and then writing the replacement software or data into the flash memory. A mechanism is provided to temporarily maintain power to the processing system in the event power to the box is lost during downloading. The mechanism allows the writing of a current block to be completed. An indication of the current block is maintained while power is absent so that downloading can be resumed once power is restored from the last block that was written.

18 Claims, 12 Drawing Sheets

REMOTE UPGRADE OF SOFTWARE OVER A NETWORK

The present application is a continuation-in-part of U.S. patent application having application Ser. No. 08/660,088, filed on Jun. 3, 1996 pending, and U.S. patent application having application Ser. No. 08/656,924, filed on Jun. 3, 1996 pending.

FIELD OF THE INVENTION

The present invention pertains to the field of computer software. More particularly, the present invention relates to upgrading software in a processing system over a network.

BACKGROUND OF THE INVENTION

The number of homes and businesses using personal computers has increased substantially in recent years, and along with this increase has come an explosion in the use of the Internet, and particularly the World-Wide Web ("the Web"). The Web is a collection of formatted hypertext pages located on numerous computers around the world that are logically connected by the Internet. Although "the Web" has in the past been a source of primarily scientific and technical information, it is now a valuable resource for information relating to almost any subject, including business, entertainment, travel, and education, to name just a few. Advances in network technology, and especially in software such as "Web browsers" (software applications which provide a user interface to the Web), have made the Web accessible to a large segment of the population. However, despite the growth in the development and use of the Web, many people are still unable to take advantage of this important resource.

Access to the Web has been limited to people who have access to a personal computer. Yet some people cannot afford the cost of even a relatively inexpensive personal computer, while others are unable or unwilling to learn the basic computer skills that are required to access the Web. Furthermore, Web browsers in the prior art generally do not provide the degree of user-friendliness desired by some people who lack computer experience, and many computer novices do not have the patience to learn how to use the software. Some people, for example, dislike an interface which requires them to identify hypertext objects and use the point-and-click technique to browse through Web pages.

Most people, however, feel quite comfortable using a remote control to operate a television set. Therefore, it would be desirable to allow a person to access the World-Wide Web without the use of a personal computer. In particular, it would be desirable for a person to be able to access and navigate through Web pages using an ordinary television set and a remote control. It would further be desirable to have a user interface by which a person can use a remote control to navigate between hypertext objects on a Web page with minimal effort or thought, so that a person feels more as if he or she is simply changing television channels rather than utilizing a complex computer network.

In addition to deficiencies in user interfaces, another problem commonly associated with Web browsing is communications latency. People commonly experience long, frustrating delays when browsing the Web. There are many possible causes for latency, such as heavy communications traffic on the Internet, slow response of remote servers, or the need to download very large files, as in the case of many images or audio files. Therefore, what is needed is a means for reducing such latency to eliminate some of the frustration which typically has been associated with Web browsing.

Another problem encountered by computer users in general is that software applications tend to become outdated quickly. Accordingly, software suppliers periodically produce upgrades, which are often distributed in the same way that the original software was distributed, such as on magnetic or optical disks or other similar storage devices. However, the distribution of software upgrades on storage media such as these has disadvantages. For example, it is inconvenient and sometimes annoying for the user to have to repeatedly install software upgrades, which can be a time-consuming process. Further, a user may not be aware that an upgrade is available or necessary, or he may forget to obtain or install the upgrade. The failure to install an upgrade or a delay in installing an upgrade can be detrimental, since the upgrade may add valuable new features to the software or remedy a bug (error) in the software. Therefore, what is needed is a technique for allowing a software upgrade to be automatically provided over a network in a manner which requires little or no effort on the part of the user.

SUMMARY OF THE INVENTION

A method of updating information stored in a client processing system coupled to communicate with a server processing system over a network is provided. Information that has been transmitted onto the network from the server processing system is downloaded from the network. The downloaded information is then written into a flash memory in the client processing system to update existing information that is stored in the flash memory.

Another aspect of the present invention is a method of reducing latency experienced by a client processing system when accessing the World Wide Web. The client processing system is coupled to a server processing system and includes a processor and a read-only memory (ROM). The client processing system is programmed with computer program instructions for allowing a user of the processing system to browse the World Wide Web. In the method, a first set of data associated with at least one Web resource is stored in the ROM in the client processing system. In response to a request by the client processing system to access a Web resource, data associated with the Web resource is provided to the client processing system, excluding any data represented in the first set.

Yet another aspect of the present invention is a method of allocating memory in a processing system including a processor, a mask ROM, and a flash memory. The processing system further has a memory map which specifies the allocation of the processing system's memory resources. In the method, a first memory space of the memory map is assigned to the mask ROM. A second memory space of the memory map is assigned to the flash memory, such that the first memory space and the second memory space are adjacent in the memory map.

Still another aspect of the present invention is a processing system which is capable of being coupled to a second processing system over a network. The processing system comprises means for causing information that has been transmitted from the second processing system to be downloaded to the first processing system. The information can be represented as a plurality of subsets. The processing system further includes memory means for storing the information, detection means for detecting an interruption in the downloading process, and sustaining means for sustaining operation of the processing system for a predetermined time interval following the interruption. The processing system further includes storing means for causing the information to be written into the memory means. The storing means is also for causing a progress indication to be stored in the memory means. The progress indication identifies which of the subsets of the information have been written into the memory means so far. The storing means is also for allowing a next one of the subsets to be written into the memory means after a given one of the subsets has been written into the memory means, only if an interruption in downloading has not been detected by the detection means.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for performing a remote upgrade of software over a network are described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description.

In one embodiment, steps according to the present invention are embodied in machine-executable software instructions, and the present invention is carried out in a processing system by a processor executing the instructions, as will be described in greater detail below. In other embodiments, hardwired circuitry may be used in place of, or in combination with, software instructions to implement the present invention.

The present invention relates to a system in which a set-top box is connected to a television and to one or more servers over the Internet. The set-top box includes a processing system that executes browser software to enable a user to browse through World-Wide Web pages displayed on the television using a remote control device. As will be described below, the browser is upgraded or reconfigured by downloading to the set-top box replacement software or data transmitted from a server over the network and then writing the replacement software or data into a programmable, non-volatile memory in the set-top box.

In one embodiment, the present invention is included in a system known as WebTV™ (WebTV), which uses a standard television set as a display device for browsing the Web and which connects to a conventional network, such as the Internet, using standard telephone, ISDN, or similar communication lines. In accordance with the present invention, a user of a WebTV client system can utilize WebTV network services provided by one or more remote WebTV servers. The WebTV network services are used in conjunction with software running in a WebTV client system to browse the Web, send electronic mail, and to make use of the Internet in various other ways. The WebTV servers function as proxies by retrieving, from a remote server, Web pages or other data requested by a WebTV client system and then transmitting the requested information to the WebTV client system.

I. System Overview

Figure 1:
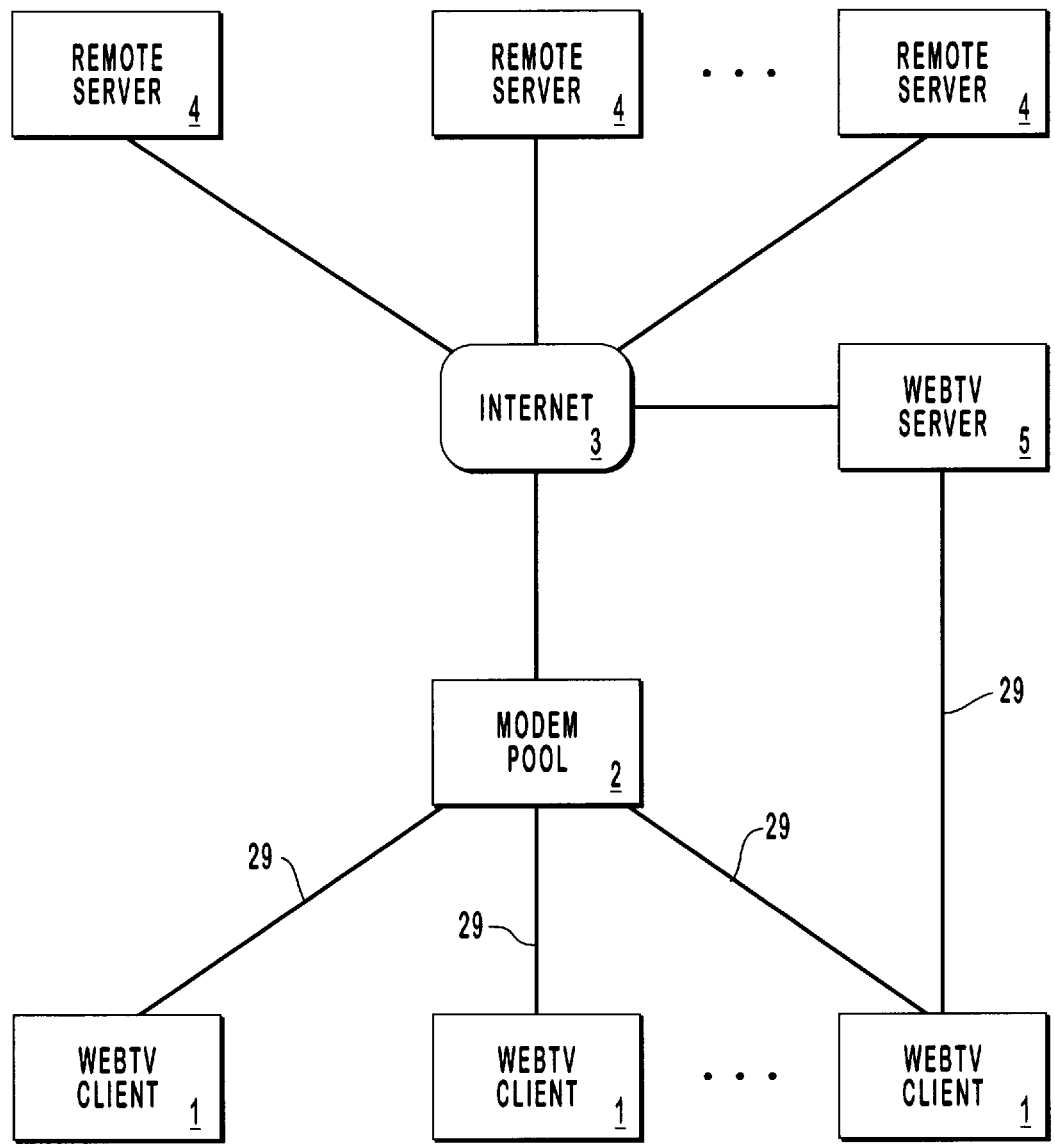
FIG. 1 illustrates several WebTV client systems connected to a WebTV server system.

FIG. 1 illustrates a configuration of the WebTV network according to one embodiment. A number of WebTV clients 1 are coupled to a modem pool 2 via direct-dial, bi-directional data connections 29, which may be telephone (POTS, i.e., "plain old telephone service"), ISDN (Integrated Services Digital Network), or any other similar type of connection. The modem pool 2 is coupled typically through a router, such as that conventionally known in the art, to a number of remote servers 4 via a conventional network infrastructure 3, such as the Internet. The WebTV system also includes a WebTV server 5, which specifically supports the WebTV clients 1. That is, the server 5 provides the WebTV services to the WebTV clients 1. Each of the clients 1 can connect to the server 5 either through direct telephone or ISDN connection or through the Internet 3 via the modem pool 2. Note that the modem pool 2 is a conventional modem pool, such as those found today throughout the world providing access to the Internet and private networks. Modem pool 2 may be provided by a local Internet Service Provider (ISP).

A. Server System Architecture

Figure 2:
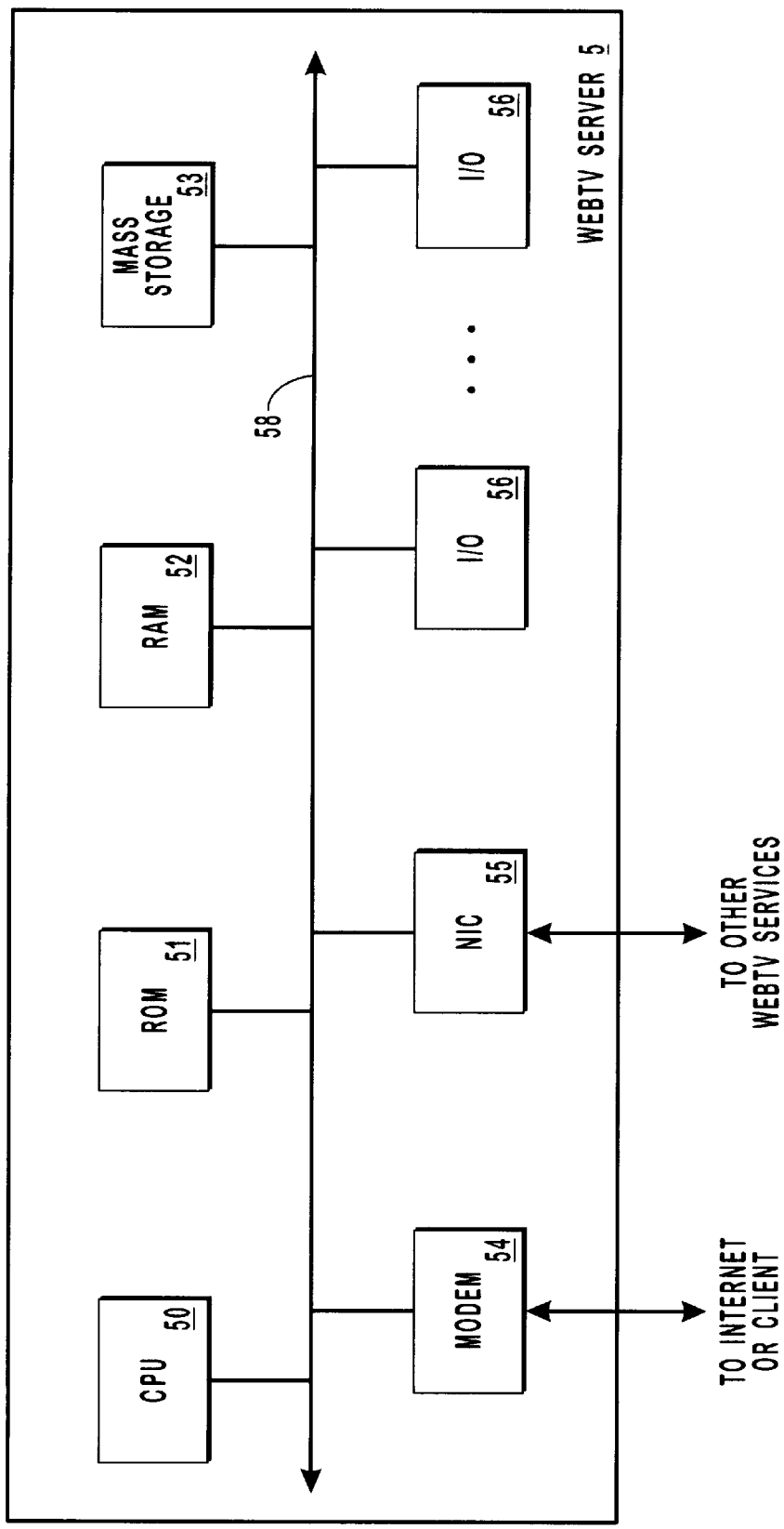
FIG. 2 illustrates a WebTV server system.

The WebTV server 5 generally includes one or more computer systems generally having the architecture illustrated in FIG. 2. It should be noted that the illustrated architecture is only exemplary; a WebTV server is not constrained to the illustrated architecture. The illustrated architecture includes a central processing unit (CPU) 50, random access memory (RAM) 51, read-only memory (ROM) 52, a mass storage device 53, a modem 54, a network interface card (NIC) 55, and various other input/output (I/O) devices 56. Mass storage device 53 includes a magnetic, optical, or other equivalent storage medium. I/O devices 56 may include any or all of devices such as a display monitor, keyboard, cursor control device, etc. Modem 54 is used to communicate data to and from remote servers 4 via the Internet.

As noted above, the server 5 may actually comprise multiple physical and logical devices connected in a distributed architecture. Accordingly, NIC 55 is used to provide data communication with other devices that are part of the WebTV services. Modem 54 may also be used to communicate with other devices that are part of the WebTV services and which are not located in close geographic proximity to the illustrated device.

B. Client System Architecture

Figure 3:
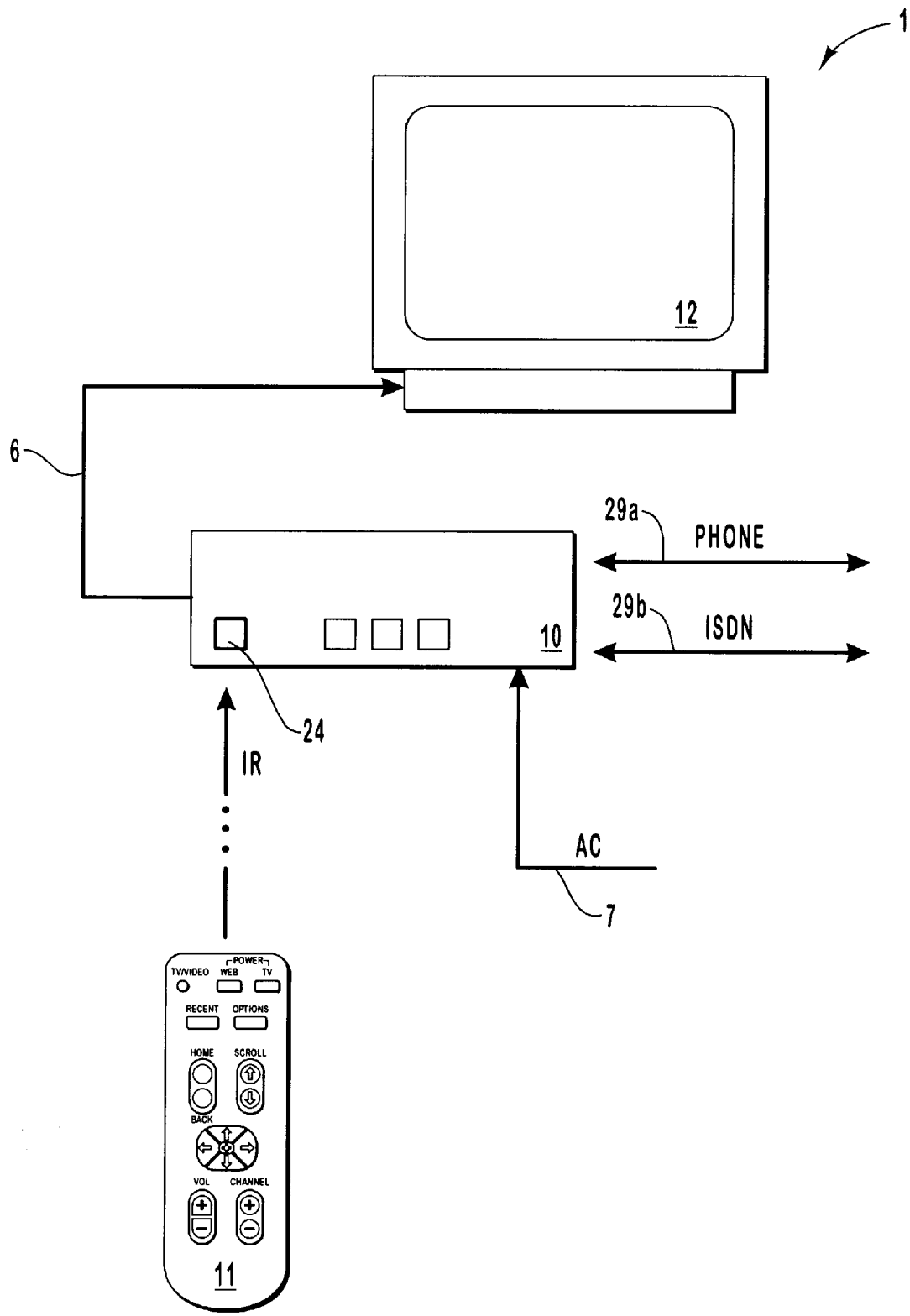
FIG. 3 illustrates a WebTV client system.

FIG. 3 illustrates a WebTV client system 1 according to one embodiment. The client system 1 includes an electronics unit 10 (hereinafter referred to as "the WebTV box 10" or "the box 10"), an ordinary television set 12, and a hand-held remote control 11. In an alternative embodiment of the present invention, the WebTV box 10 is built into the television set 12 as an integral unit. The box 10 includes hardware and software for providing the user with a graphical user interface, by which the user can access the WebTV network services, browse the Web, send e-mail, and otherwise access the Internet.

The WebTV client system 1 uses the television set 12 as a display device and an audio output device. The box 10 is coupled to the television set 12 by a link 6. The link 6 includes an audio channel for generating sound from the television's speaker and a video channel in the form of RF (radio frequency), S-video, composite video, or other format. The communication link 29 between the box 10 and the server 5 is either a telephone (POTS) connection 29a or an ISDN connection 29b. The box 10 receives AC (alternating current) power through an AC power line 7.

Remote control 11 is operated by the user in order to control the client system 1 to browse the Web, send e-mail, and perform other Internet-related functions. The box 10 receives commands from remote control 11 via an infrared (IR) communication link. In alternative embodiments, the link between the remote control 11 and the box 10 may be RF or any equivalent mode of transmission.

The box 10 includes application software which, when executed by a processor in the box 10, provides the user with a graphical user interface by which the user can access the WebTV network services and browse the Web. The application software is automatically executed upon application of power to the box 10.

Figure 4:
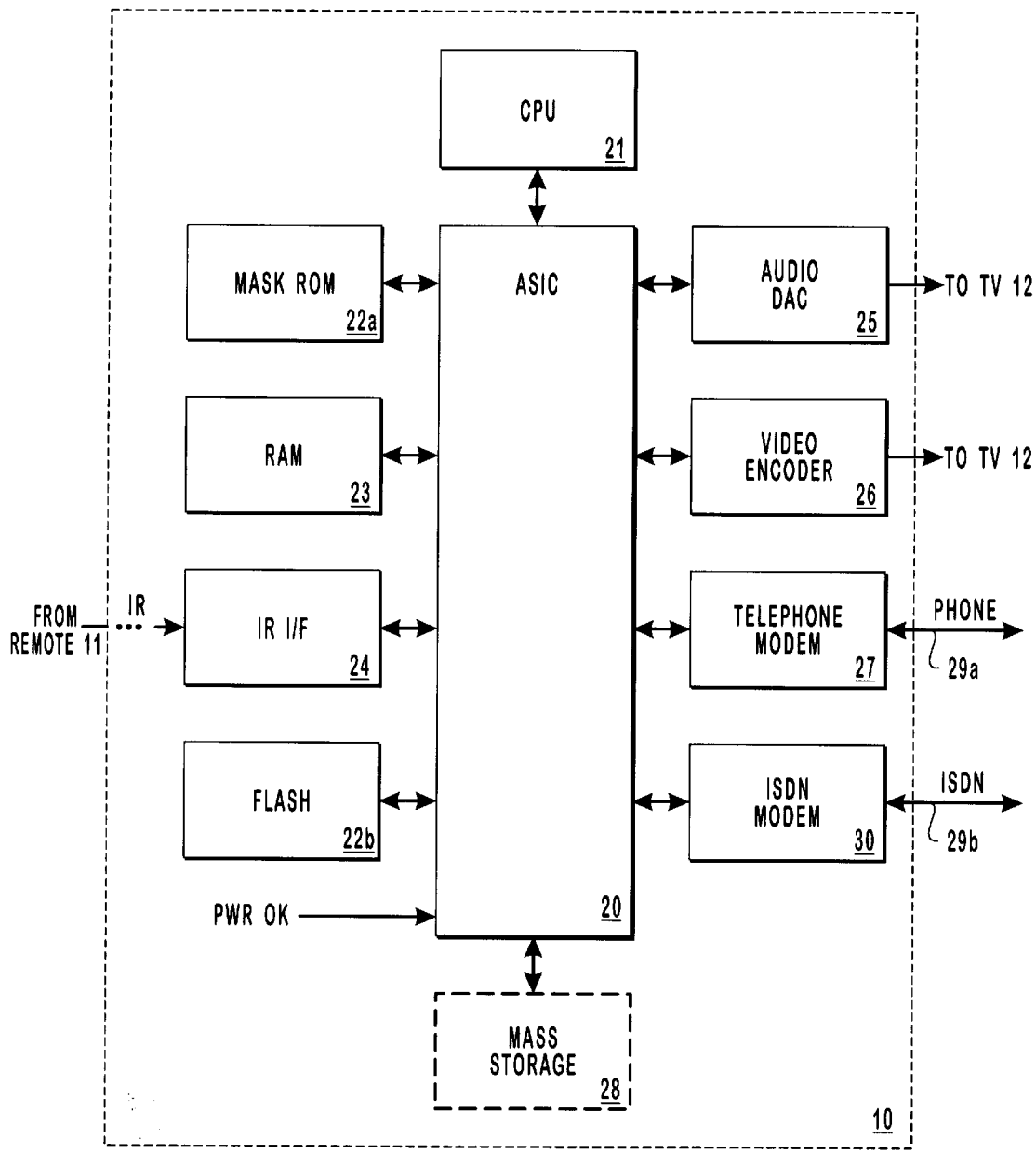
FIG. 4 is a block diagram of an electronics unit of a WebTV client system.

FIG. 4 shows the internal components of the WebTV box 10. Operation of the client system 1 is controlled by a CPU 21, which is coupled to an Application-Specific Integrated Circuit (ASIC) 20. The CPU 21 executes software designed to implement features of the present invention. ASIC 20 contains circuitry which is used to implement certain functions of the WebTV system. ASIC 20 is coupled to an audio digital-to-analog converter 25 which provides audio output to television 12. In addition, ASIC 20 is coupled to a video encoder 26 which provides video output to television set 12. An IR interface 24 detects IR signals transmitted by remote control 11 and, in response, provides corresponding electrical signals to ASIC 20. A standard telephone modem 27 and an ISDN modem 30 are coupled to ASIC 20 to provide connections 29a and 29b, respectively, to the modem pool 2 and, via the Internet 3, to the remote servers 4. Note that, while the illustrated embodiment includes both a telephone modem 27 and an ISDN modem 30, either one of these devices will suffice to practice the present invention. Further, in various other embodiments, the telephone modem 27 and the ISDN modem 30 each may be replaced by or supplemented with other communications devices, such as a cable television modem. In addition, in other embodiments, communication with the server 5 might be made via a token ring or Ethernet connection. Note that the box 10 also may include a cable television modem (not shown).

Also coupled to ASIC 20 is mask Read-Only Memory (ROM) 22a, a flash memory 22b, and a Random Access Memory (RAM) 23. Mask ROM 22a (which is so named because it is non-programmable) provides storage of certain program instructions and data, as will be described below. Flash memory 22b is a conventional flash memory device that can be written to (programmed) and erased electronically. Flash memory 22b provides storage of the browser software as well as data. In one embodiment, a mass storage device 28 is included in the WebTV box and coupled to ASIC 20. The mass storage device 28 may be used to input software or data to the client or to download software of data received over network connection 29. The mass storage device 28 includes any suitable medium for storing machine-executable instructions, such as magnetic disks, optical disks, and the like.

Figure 5:
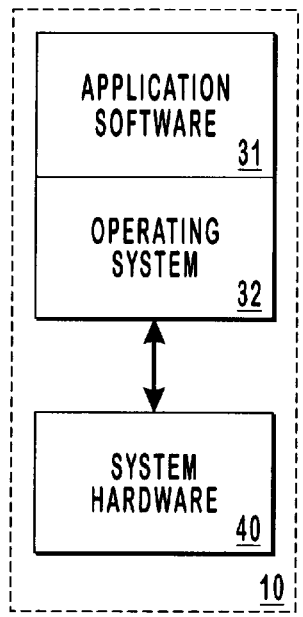
FIG. 5 illustrates the functional relationship between hardware and software in the client processing system of FIG. 1.

As mentioned above, the WebTV box 10 includes application software including a Web browser. Referring now to FIG. 5, the above-mentioned application software 31 operates in conjunction with operating system (OS) software 32. The OS software 32 includes various device drivers and otherwise provides an interface between the application software 31 and the system hardware components 40 (i.e., the elements illustrated in FIG. 4).

In one embodiment, the application software 31 and the OS software 32 are stored in flash memory 22b. It will be recognized, however, that some or all of either the application software 31 or the OS software 32 or both can be stored in any other suitable storage medium, such as mask ROM 22a or mass storage device 28, in various embodiments.

As mentioned above, steps according to the present invention are embodied in machine-executable instructions according to one embodiment. For example, in one embodiment the present invention is carried out in the WebTV box 10 by the CPU 21 executing sequences of instructions contained in mask ROM 22a, flash memory 22b, or RAM 23, or a combination of these devices. More specifically, execution of the sequences of instructions causes the CPU 21 to perform the steps of the present invention. These steps will be described below. Instructions for carrying out the present invention may be loaded into memory from a persistent store, such as mass storage device 28, and/or from one or more other computer systems over a network, such as the WebTV server 5 or a remote server 4. For example, such a server system may transmit a sequence of instructions to the client system 1 in response to a message transmitted to the server system over the Internet 3 by the client system 1. As the client system 1 receives the instructions via a network connection, such as modem 27a, the client system 1 stores the instructions in a memory. The client system 1 may store the instructions for later execution or execute the instructions as they arrive over the network connection.

In some embodiments, the downloaded instructions may be directly supported by the CPU 21. Consequently, execution of the instructions may be performed directly by the CPU 21. In other embodiments, the instructions may not be directly executable by the CPU 21. Under these circumstances, the instructions may be executed by causing the CPU 21 to execute an interpreter that interprets the instructions, or by causing the CPU 21 to execute instructions which convert the received instructions into instructions that can be directly executed by the CPU 21.

Certain embodiments and aspects of the present invention may be carried out in the WebTV server 5, instead of (or in addition to) being carried out in the WebTV client system 1. For example, the CPU 50 of the WebTV server 5 may execute instructions stored in memory to perform steps in accordance with the present invention.

In various embodiments, hardwired circuitry may be used in place of, or in combination with, software instructions to implement the present invention. Thus, the present invention is not limited to any specific combination of hardware circuitry and software, nor to any particular source for the instructions executed by a computer system.

II. Remote Download

As indicated above, the browser software can be upgraded or reconfigured by downloading to the box replacement software or data transmitted from a server via the Internet or via direct phone connection. The programmable nature of flash memory 22b and its ability to retain programmed information in the absence of power are used to advantage in performing such an upgrade or reconfiguration. As will be explained in greater detail below, replacement software or data transmitted from the WebTV server 5 (or another server designated by the WebTV server 5) is automatically written into the flash memory 22b in the WebTV box 10. In addition, the flash memory can be used to store various resources downloaded form the Web, such as Java applets (programs), so that such resources will be retained in the event of loss of power to the client system 1. Note that the present invention does not necessarily require use of a flash memory for these purposes; other forms of programmable non-volatile memory may be used, such as an electrically-erasable programmable ROM (EEPROM).

In one embodiment, the browser software of the WebTV system is stored in flash memory 22b to allow the software to be reconfigured. Data that is used by the software to generate the browser environment is generally stored in mask ROM 22a. This data includes various configuration parameters, such as fonts, images, sounds, telephone numbers for connecting to the server 5 or the modem pool 2, and connection scripts used to establish communication with the WebTV server 5, the modem pool 2 or other servers.

Data items in the mask ROM 22a can be overridden (superseded) by storing alternate ("override") data items in flash memory 22b. Thus, if a particular data item is present in flash memory 22b, the client system 1 will ignore the corresponding data item in mask ROM 22a. Hence, the browser can be upgraded or reconfigured by adding to or replacing computer program instructions stored in flash memory 22b, data stored in flash memory 22b, or both.

Certain types of flash memory are manufactured with a small number of so-called "boot blocks". Boot blocks generally are smaller in size than the standard blocks within the memory. For example, in one particular type of flash memory, the size of a single standard block of memory is 64 KBytes, while a typical boot block is 8 KBytes. Therefore, in one embodiment, certain override data or other data is stored in the boot blocks of the flash memory 22b. This technique avoids wasting large amounts of memory space when a single block of flash memory cannot be fully utilized.

A download from the Internet 3 can be performed for purposes of upgrading the WebTV client system 1 or reconfiguring the client system 1 to correct an inconsistent state (e.g., an error in the program instructions or data). The WebTV client system 1 determines whether a download from the network should take place each time the client system 1 is reset. More specifically, a download will be performed if, upon reset, the client system 1 detects an error condition or, in the case of an upgrade, the client system 1 finds a download request in memory. Accordingly, FIG. 6 illustrates a reset routine performed by the WebTV client system 1 according to one embodiment.

Figure 6:
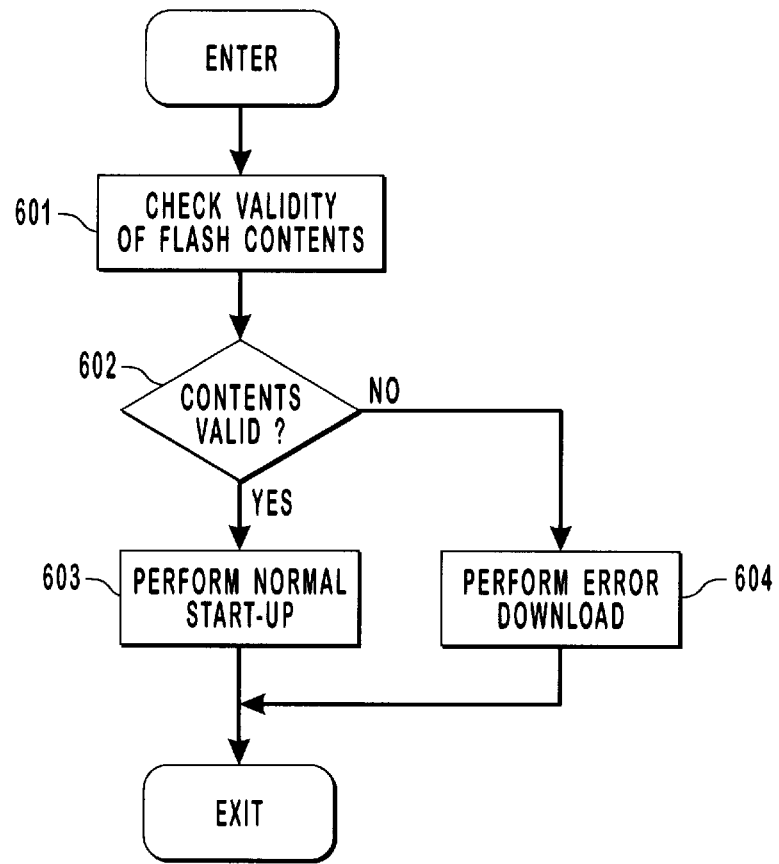
FIG. 6 is a flow diagram illustrating a reset routine for a WebTV client system.

The reset routine of FIG. 6 is performed any time the client system 1 is reset during operation or any time power to the box 10 is turned on. In one embodiment, the routine of FIG. 6 is performed by execution of start-up instructions stored in the mask ROM 22a. In step 601, the validity of all contents of the flash memory 22b (i.e., program instructions and data) are verified using a conventional checksum technique. If the contents are valid (step 602), then the normal start routine is performed in step 603. If the contents of flash memory 22b are not valid (i.e., are corrupted or otherwise found to represent an inconsistent state), then an error download routine is performed in step 604. In the error download routine, some or all of the corrupt information in the flash memory is replaced by correct information downloaded from the Internet 3. The error download routine is described further below. Thus, the WebTV system allows errors in the programming or data to be detected and automatically corrected by performing the error download routine, without intervention by the user of the WebTV client system 1.

Figure 7:
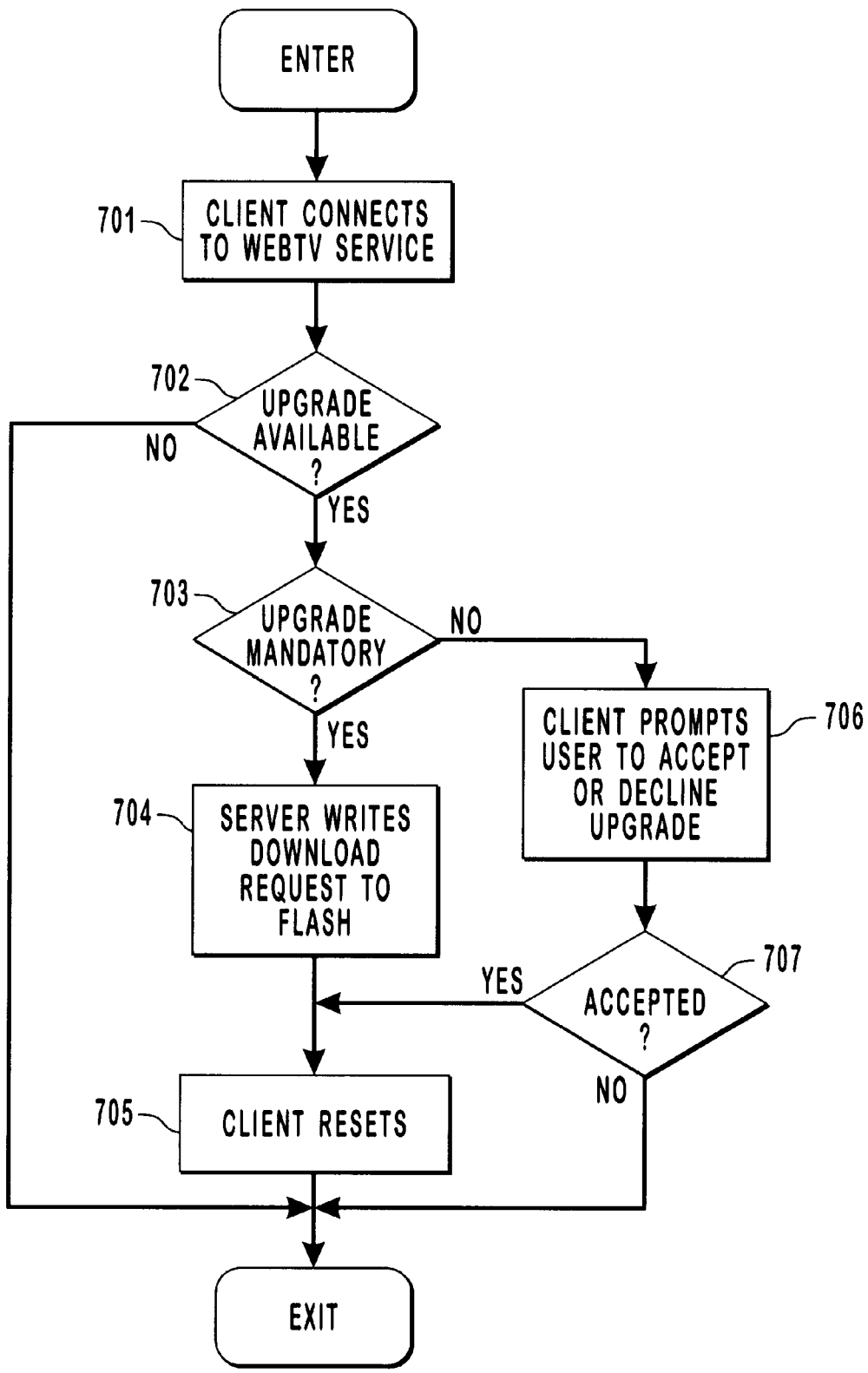
FIG. 7 is a flow diagram illustrating a normal start-up routine for initiating an upgrade of a WebTV client system over the network.

FIG. 7 illustrates a routine by which an upgrade of the Web browser is initiated. During a normal start-up (i.e., when no error was detected upon reset), the client system 1 automatically connects to the WebTV server 5 in step 701. Generally, this connection is made via the modem pool 2 by executing a connection script. If an upgrade is determined to be available in step 702, and the upgrade is designated as mandatory in step 703, then the server sends a command to the client system 1 to cause a download request to be written into the flash memory 22b of the client system 1 in step 704. The client system 1 is then commanded by the WebTV server 5 in step 705 to reset according to the routine of FIG. 6. If an upgrade is determined to be available in step 702, and the upgrade is not designated as mandatory in step 703, then the client system 1 prompts the user in step 706 to either accept or decline the upgrade. If the upgrade is accepted in step 707, then the client system 1 resets in step 705 according to the routine of FIG. 6. If not, the routine ends.

Figure 8:
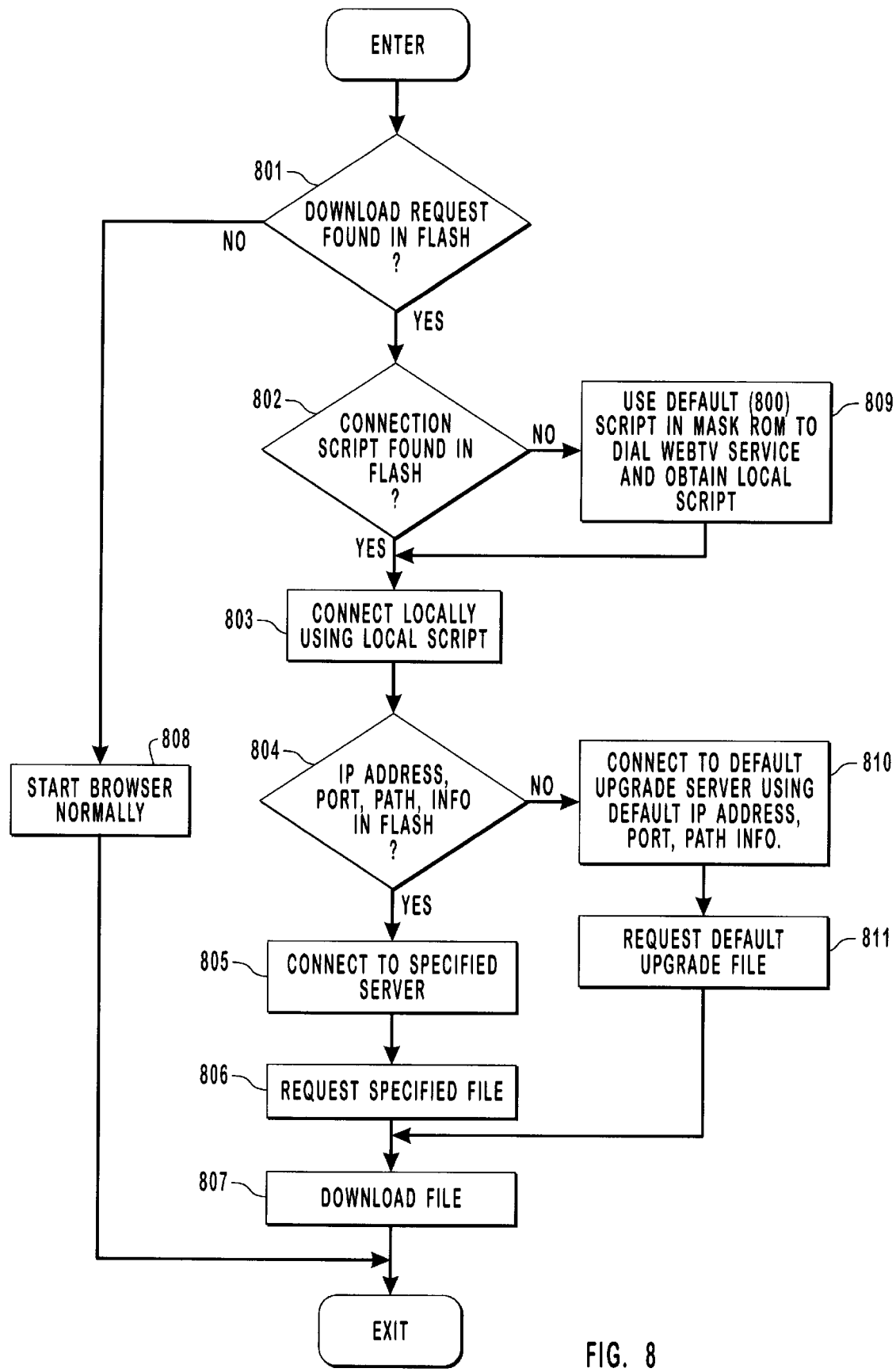
FIG. 8 is a flow diagram illustrating a routine for initiating a download for the purpose of upgrading a WebTV client system.

FIG. 8 illustrates a portions of the normal start-up routine (i.e., step 603 in FIG. 6) for initiating an upgrade. Initially, the client system 1 determines in step 801 whether a download request is present in flash memory 22b. If not, the browser program is started normally in step 808. If a download request is found in flash memory 22b, then it is next determined in step 802 whether a connection script is present in flash memory 22b.

As mentioned above, the connection script is executed to establish communication with the WebTV server 5 or the modem pool 2. Generally, a local connection script is stored in flash memory 22b to allow connection to the local modem pool 2. A default connection script is stored in mask ROM 22a, which allows direct connection to the WebTV server 5 using a toll-free (e.g., "1-800-") telephone number. The default connection script is generally used only if a local connection script is not found in flash memory 22b.

Referring still to FIG. 8, if the local connection script is found in flash memory 22b (step 802), then in step 803 the client system uses that connection script too connect to the WebTV server 5 via the local modem pool 2. Assuming such connection is made, a determination is then made in step 804 as to whether an IP (Internet Protocol) address, a port, and path information for the upgrade is stored in the flash memory 22b. The WebTV server 5 may provide such information to the client system 1 if the upgrade is to be downloaded from a server other than a default server, which may be the WebTV server 5. If such information has been provided, then the client system 1 connects to the specified server in step 805, requests the specified file in step 806, and initiates downloading of the file in step 807. If an IP address, port, and path are not found in flash memory 22b, then in step 810 the client system 1 connects to the default server using a default IP address, port, and path stored in mask ROM 22a. A default upgrade file is then requested using this stored information in step 811. In step 811, the client system 1 also indicates to the default server which version of software it is currently running, so that the default server can determine the proper default file for that client system. Downloading of the default file is initiated in step 807 after the client system has requested a file. As mentioned above, downloading to the client system 1 occurs via the Internet 3 via the modem pool 2. Once downloaded, the information is automatically decompressed (if compression was applied) and written into flash memory 22b by the client system 1.

Hence, an optional upgrade is performed automatically without any input from the user of the client system 1, other than the user's answering a prompt on whether to accept the upgrade. A mandatory upgrade is performed without any input from the user and, in fact, can be performed without informing the user, if desired.

Figure 9:
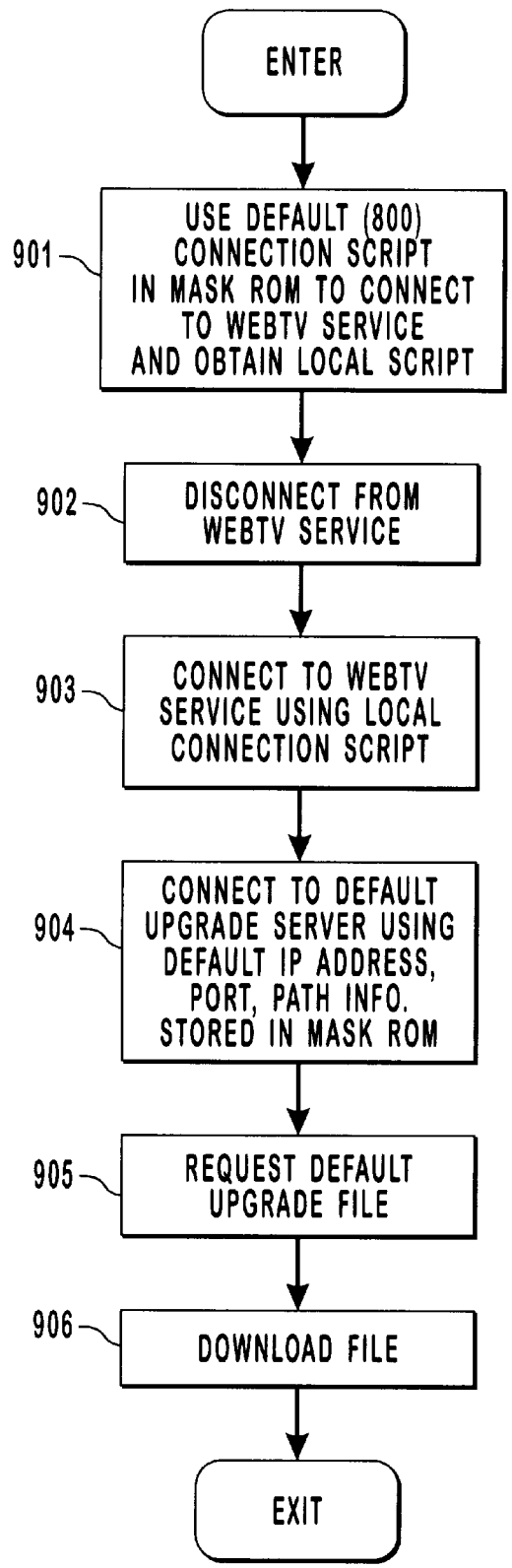
FIG. 9 is a flow diagram illustrating a routine for initiating a download to correct an error.

FIG. 9 illustrates a routine by which an error in the client system's programming or data can be automatically corrected, such as when an error or other inconsistent state is found during the reset routine (FIG. 6). It will be seen that such correction occurs automatically without any input from the user and, in fact, can occur without informing the user, if desired. Initially, in step 901 the client system 1 connects to the server 5 directly using the default toll-free number stored in mask ROM 22a. Once connected, the client system 1 obtains a local connection script from the server 5. The client system 1 then disconnects from the server 5 and then reconnects to the server 5 via the local modem pool 2 using the local connection script. The client system 1 then further establishes a connection to the default server in step 903 using the default IP address, port, and path stored in mask ROM 22a. In step 904, the client system 1 requests the default upgrade file from the default server using the default IP address, port, and path. In step 904, the client system 1 also indicates to the default server which version of software it is currently running, so that the default server can determine the proper default file for that client system. In step 905, the requested file is downloaded over the Internet 3. The downloaded file is then written into flash memory 22b.

Figure 10:
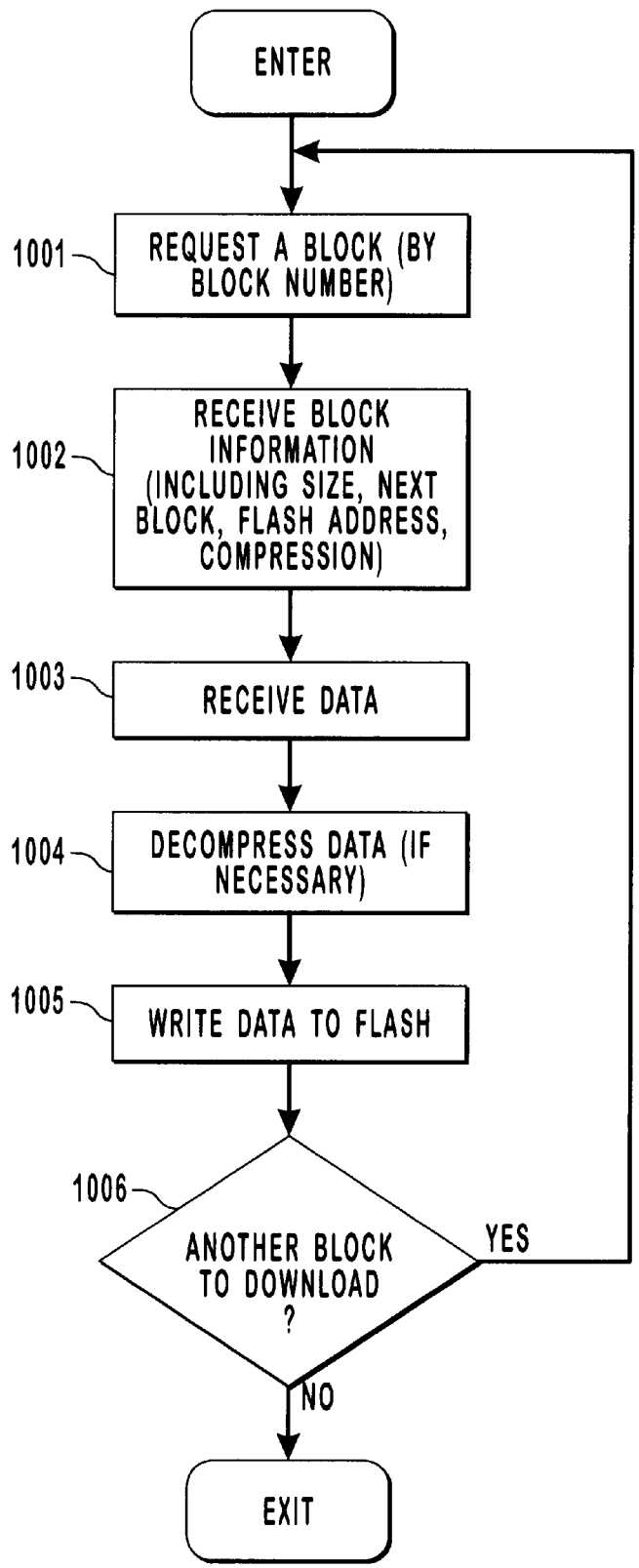
FIG. 10 is a flow diagram illustrating a routine for downloading to the WebTV system from the network.

FIG. 10 illustrates the downloading process in greater detail. When downloading is initiated, the client system 1 requests a block of data (which may actually comprise computer program instructions) by block number in step 1001. In step 1002, the client system 1 receives certain block information from the server that will transmit the data, including the size of the block to be downloaded, an identification of the next block to be downloaded, the address in flash memory 22b to which the current block is to be written, and a description of any data compression that is to be applied before transmission over the Internet 3. The data is then transmitted over the Internet 3 to the client system 1. In step 1003, the client system 1 receives the data via the network connection 29 and loads the data into RAM 23. In step 1004 the client system 1 decompresses the data, assuming data compression was used. In step 1005, the client system writes the data into flash memory 22b using the address received in step 1002. If there is another block to be downloaded according to the next block information (step 1006), the routine repeats from step 1001. Otherwise, the routine ends.

III. Caching of Web Resources

A problem associated with browsing the Web is communications latency. In prior art systems, long delays are commonly experienced, for example, when downloading images, audio data, or other resources that require large amounts of data. The present invention includes a technique for reducing such latency.

Certain Web resources will be accessed repeatedly and frequently by the client system 1. Such resources include, for example, the home page of the WebTV services, the WebTV logo, and formatting graphics for displays. Therefore, in accordance with the present invention, certain resources such as the aforementioned are cached in either the mask ROM 22a, flash memory 22b, or both. Resources that are cached in flash memory 22b can be added to, removed, or updated from the server 5 via the Internet or direct phone connection in the manner described above. Consequently, when a Web page containing such resources is requested by the client system 1, there is no need to download these resources from the Internet 3. Rather, these resources can be retrieved directly from mask ROM 22a or flash memory 22b, which can be accomplished much more quickly than downloading the resources from the network. As a result of this caching, the total amount of information to be downloaded in response to the request is reduced, so that the overall download time for the request is reduced.

The server 5 maintains knowledge at all times of what Web resources are cached in the client system 1. Therefore, when a request is received by the server 5 from the client system 1, the request is checked against the WebTV server's knowledge of what is cached. Any resources found to be cached in the client system will not be retrieved by server 5 from a remote server 4 or transmitted to the client system 1.

Figure 11:
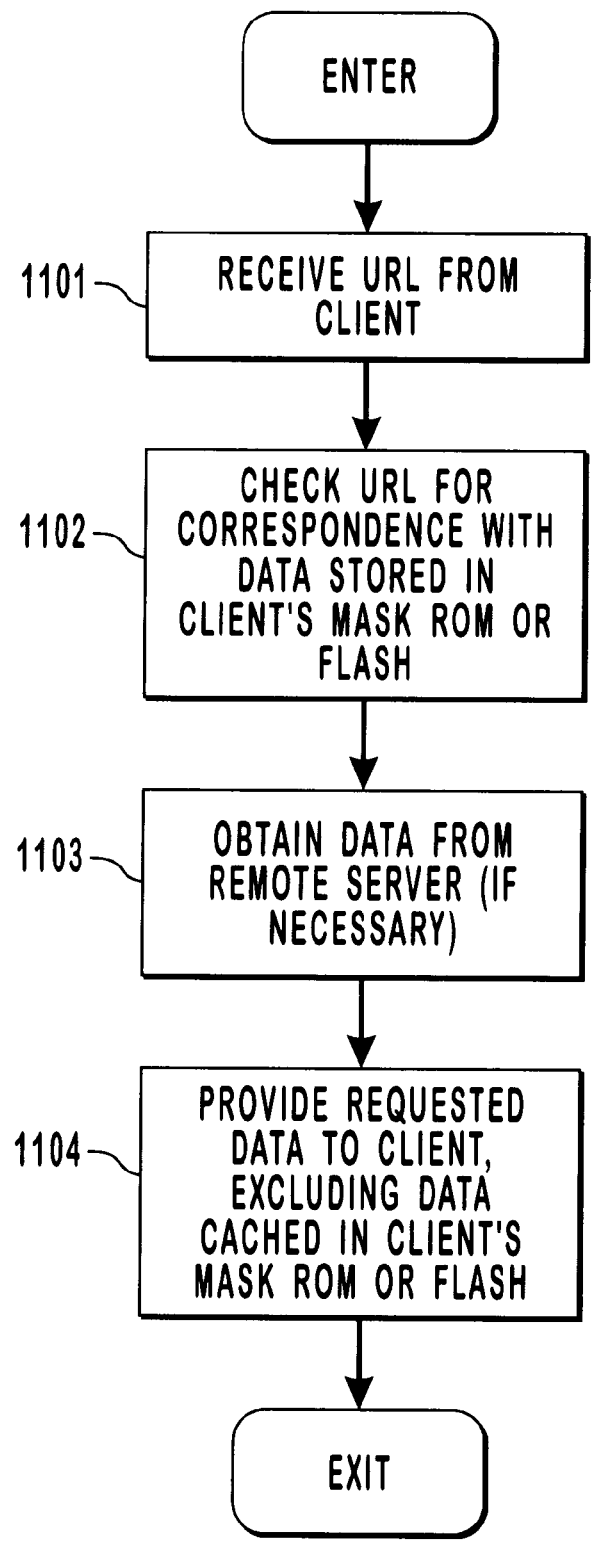
FIG. 11 is a flow diagram illustrating a routine for accessing Web resources cached in ROM.

FIG. 11 illustrates a routine performed by a WebTV server 5 in response to a request from the client system 1. Initially, in step 1101 the server 5 receives a Uniform Resource Locator (URL) from the client system 1 in response to the user of the client system 1 selecting a hypertext object. The server 5 then checks the received URL in step 1102 for correspondence with the cached data stored in either mask ROM 22a or flash memory 22b. In step 1103, the server 5 obtains the requested Web page (or other data) from the appropriate remote server 4. The requested Web page (or other data) is then downloaded to the client system 1 in step 1104, excluding any data that is known to be cached in the client system 1.

IV. Abutting Mask and Flash Memory Spaces

Because the client system 1 includes both mask ROM 22a and flash memory 22b, memory usage can be allocated between these two devices in a manner that is advantageous for operation of the client system 1. In particular, Flash memory and mask ROM each generally have advantages and disadvantages. For example, while flash memory is more flexible than mask ROM due to its programmability, flash memory also tends to be more expensive than mask ROM. Therefore, in one embodiment of the present invention, these characteristics are used to advantage by storing some of the browser code (software and data) in mask ROM 22a and some of the browser code in flash memory 22b. More specifically, the portions of the code which will are not likely to change as a result of an upgrade or reconfiguration are stored in mask ROM 22a, while portions of the code which are considered likely to be upgraded or reconfigured are stored in flash ROM 22b. The result in one embodiment is that most of the browser code (e.g., the code representing the core functions) is stored in mask ROM 22a, such that the amount of flash memory required is kept relatively small. This manner of memory allocation takes advantage of both the lower cost of mask ROM and the flexibility of flash memory. However, the browser can still be easily updated or reconfigured over the Internet by downloading to the flash memory 22b in the manner described above.

Figure 12:
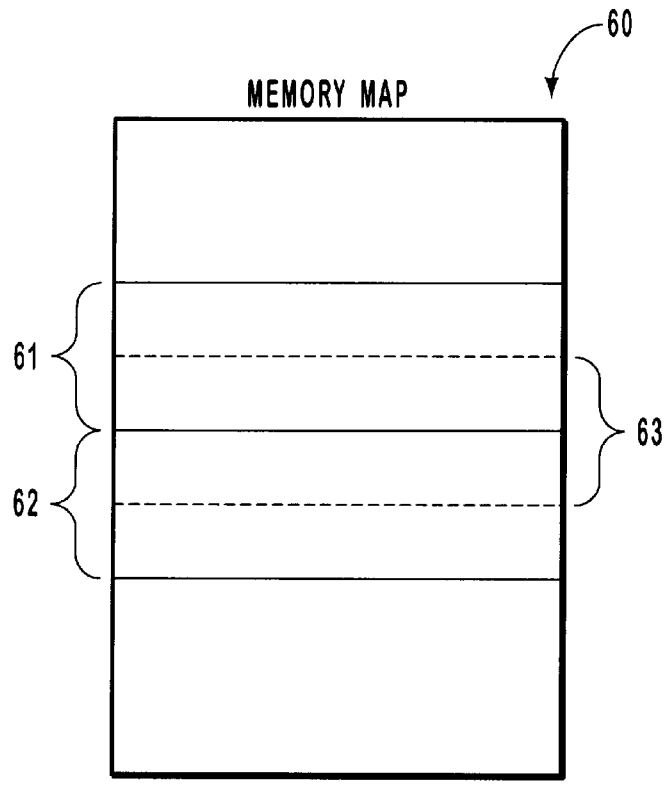
FIG. 12 illustrates a partial memory map of a WebTV client system.

Memory space can further be allocated efficiently by assigning mask ROM 22a and flash memory 22b adjacent memory spaces in the WebTV client system's memory map. As illustrated in FIG. 12, adjacent memory spaces 61 and 62 in the memory map 60 of the client system 1 can be assigned to the flash memory 22b and the mask ROM 22a, respectively. Further, the browser code can be stored in adjacent subsets of memory spaces 61 and 62, if desired, such that the browser code occupies a single, contiguous subset 63 of the memory map 60.

V. Recovery from Power Loss

It is possible that AC power to the WebTV box 10 may be temporarily lost at some point during operation of the system, such as due to the AC power cord being accidentally unplugged. The present invention therefore provides a technique for responding to and recovering from a loss of power that occurs while a download is taking place. The recovery technique also applies to a disruption in, or loss of, communication with the transmitting server.

Figure 13:
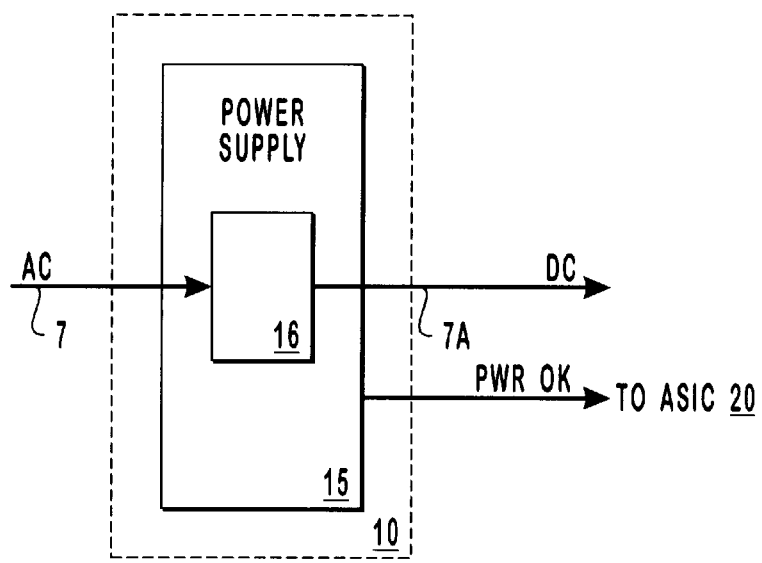
FIG. 13 illustrates a power supply of a WebTV client system.

In addition to the components shown in FIG. 4, the WebTV box 10 also includes a power supply 15, as shown in FIG. 13. The power supply 15 receives AC power via line 7 and outputs DC power to the various components of the box 10 via line 7A. In accordance with one embodiment of the present invention, the power supply 15 includes a sustaining device 16, which maintains adequate DC power to operate the client system 1 for a short period of time (e.g., one to two seconds) in the event of a loss of power on AC power line 7. More specifically, sustaining device 16 maintains power long enough to complete the writing of one block of downloaded data into flash memory 22b. This amount of time will vary, depending upon the specific type of flash memory that is used. Sustaining device 16 is coupled between the AC power line 7 and the DC power output 7A of the power supply. In one embodiment, sustaining device 16 is a conventional capacitor, the value of which is selected based on the duration of time for which power must be maintained. However, sustaining device 16 can also be a battery or any other device which performs the aforementioned function.

Figure 14:
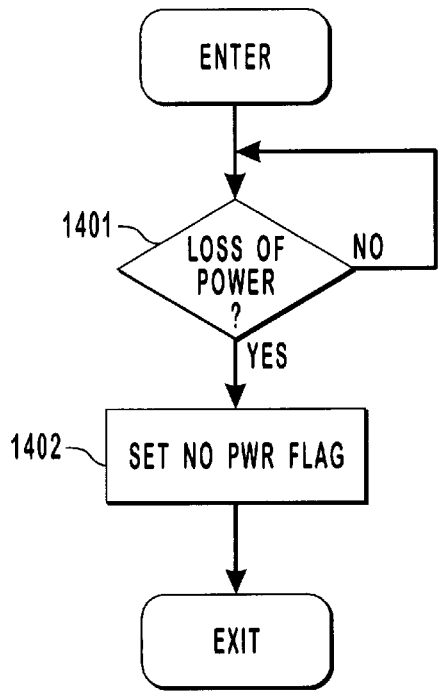
FIG. 14 is a flow diagram illustrating a routine for responding to a loss of power.

Power supply 8 also is capable of sensing a loss of AC power and outputting a corresponding signal, PWR OK, indicating whether or not AC power is present. The signal PWR OK is provided to the ASIC 20, as illustrated in FIG. 4. In the event of a loss of AC power, the signal PWR OK will immediately change status to indicate this occurrence. The signal PWR OK is used as input by the client system 1 to perform the routine of FIG. 14. That is, if a loss of power is detected in step 1401, then in step 1402 a NO PWR flag is set in the client system 1 to indicate this fact. The status of the power flag is repeatedly checked during the downloading process, as will now be described.

Figure 15:
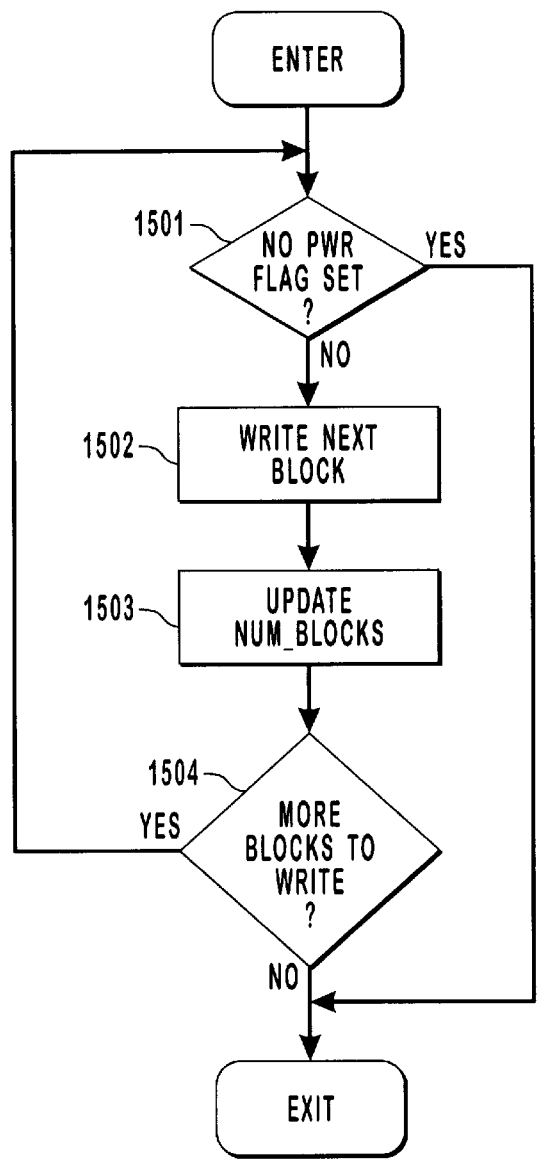
FIG. 15 is a flow diagram illustrating a routine for writing downloaded data into memory.

Referring now to FIG. 15, prior to writing any block of downloaded data into flash memory 22b, the status of the NO PWR flag is checked in step 1501. If the NO PWR flag has been set (in response to a change in the PWR OK signal), then the routine ends, such that no blocks of data are written thereafter. If the NO PWR flag has not been set, then the next block of data is written into the flash memory 22b in step 1508. A field NUM_BLOCKS is provided in flash memory 22b to indicate the number of blocks written into flash memory 22b so far. This field is updated in step 1503. If power is lost during the writing of the data block in step 1502, sustaining device 16 ensures that writing of the current block can be completed. If there are additional blocks to be written (step 1504), the routine repeats from step 1501 by checking the status of the NO PWR flag. Otherwise, the routine ends. Once power is restored and a connection to the server 5 is reestablished, downloading can be resumed. Because the number of blocks already written has been maintained in flash memory 22b (which can be verified using a checksum upon start-up), only those data blocks which had not yet been written into flash memory 22b are required to be downloaded. For the same reason, if the phone connection (or other communication link) with the transmitting server is lost or disrupted during a download, the download can be resumed from the last block written successfully, once the connection is re-established.

Thus, a method and apparatus are described for performing a remote upgrade of software over a network have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. In a networked computer system which includes a plurality of server systems each of which is connected to a network infrastructure which provides access through said servers to a plurality of sites, and the networked computer system including at least one client system which is connected either directly or logically to one or more of said servers, and each client system comprising a conventional television monitor on which to display information retrieved from of an accessed site, and an electronic unit including program instructions stored in any combination of a mask ROM, RAM, flash memory, mass storage device or CPU memory, and wherein the electronic unit includes a CPU for executing said program instructions so as to control said television monitor in order to provide a user of the client system with a graphical user interface by which the user can access the network infrastructure to browse said sites or otherwise access said network infrastructure, a method for automatically downloading to said CPU of the electronic unit software or data in order to replace or upgrade said program instructions used by the CPU to access the network infrastructure, without the need for user intervention, the method comprising the steps of:

initializing the client system by powering on the electronic unit and automatically connecting the client system to at least one of said servers;

automatically and without the need for user intervention, checking the validity of the stored program instructions to ascertain the existence of a corrupted state in the stored program instructions of the electronic unit of the client system, and if the validity of the stored program instructions is not verified, then automatically and without the need for user intervention, replacing the stored program instructions by downloading to said electronic unit a replacement for the program instructions from said at least one of said servers;

automatically and without the need for user intervention, checking said at least one sever for the existence of an upgraded version of the program instructions, and if the program instructions of the electronic unit are out of date, then automatically and without the need for user intervention, either (1) replacing the stored program instructions of the electronic unit with the upgraded program instructions downloaded from said at least one of said servers if the upgrade is designated as mandatory at said at least one server, or (2) if the upgrade is not mandatory, prompting the user to decide whether to accept the upgrade from said at least one server; and using the upgraded or replaced program instructions to control said television monitor in order to provide a user of the client system with a graphical user interface by which the user can access the network infrastructure to browse said sites or otherwise access said network infrastructure through one or more of said servers.

2. A method as defined in claim 1 wherein the step of checking the validity of the stored program instructions is comprised of the act of using a conventional checksum technique to verify said validity.

3. A method as defined in claim 1 wherein said program instructions are stored at least in part in boot blocks of the flash memory of the electronic unit, and wherein said step or replacing the stored program instructions by downloading to said electronic unit a replacement comprises the act of overwriting at least some of said boot blocks.

4. A method as defined in claim 1 wherein said program instructions are stored at least in part in boot blocks of the flash memory of the electronic unit, and wherein said step of replacing the stored program instructions of the electronic unit with the upgraded program instructions comprises the act of overwriting at least some of said boot blocks.

5. A method as defined in claims 3 or 4 wherein the replaced stored program instructions are comprised of one or more configuration parameters.

6. A method as defined in claim 5 wherein said configuration parameters comprise telephone communication parameters for enabling the client system to communicate with a server system.

7. In a networked computer system which includes a plurality of server systems each of which is connected to a network infrastructure which provides access through said servers to a plurality of sites, and the networked computer system including at least one client system which is connected either directly or logically to one or more of said servers, and each client system comprising a conventional television monitor on which to display information retrieved from of an accessed site, and an electronic unit including program instructions stored in any combination of a mask ROM, RAM, flash memory, mass storage device or CPU memory, and wherein the electronic unit includes a CPU for executing said program instructions so as to control said television monitor in order to provide a user of the client system with a graphical user interface by which the user can access the network infrastructure to browse said sites or otherwise access said network infrastructure, a computer program product for use by said electronic unit to implement a method for automatically downloading to said CPU of the electronic unit software or data in order to replace or upgrade said program instructions used by the CPU to access the network infrastructure, without the need for user intervention, the computer program product comprising:

a computer readable medium for carrying computer program code means for implementing said method; and said computer program code means comprising:

code means for initializing the client system when powering on the electronic unit and automatically connecting the client system to at least one of said servers;

code means for automatically and without the need for user intervention, checking the validity of the stored program instructions to ascertain the existence of a corrupted state in the stored program instructions of the electronic unit of the client system, and if the validity of the stored program instructions is not verified, then automatically and without the need for user intervention, replacing the stored program instructions by downloading to said electronic unit a replacement for the program instructions from said at least one of said servers;

code means for automatically and without the need for user intervention, checking said at least one server for the existence of an upgraded version of the program instructions, and if the program instructions of the electronic unit are out of date, then automatically and without the need for user intervention, either (1) replacing the stored program instructions of the electronic unit with the upgraded program instructions downloaded from said at least one of said servers if the upgrade is designated as mandatory at said at least one server, or (2) if the upgrade is not mandatory, prompting the user to decide whether to accept the upgrade from said at least one server; and replacing the stored program instructions of the electronic unit with the upgraded program instructions downloaded from said at least one of said servers; and code means for using the upgraded or replaced program instructions to control said television monitor in order to provide a user of the client system with a graphical user interface by which the user can access the network infrastructure to browse said sites or otherwise access said network infrastructure through one or more of said servers.

8. A computer program product as defined in claim 7 wherein the code means for checking the validity of the stored program instructions is comprised of code means for using a conventional checksum technique to verify said validity.

9. A computer program product as defined in claim 7 wherein said program instructions are stored at least in part in boot blocks of the flash memory of the electronic unit, and wherein said code means for replacing the stored program instructions by downloading to said electronic unit a replacement comprises code means for overwriting at least some of said boot blocks.

10. A computer program product as defined in claim 7 wherein said program instructions are stored at least in part in boot blocks of the flash memory of the electronic unit, and wherein said code means for replacing the stored program instructions of the electronic unit with the upgraded program instructions comprises code means for overwriting at least some of said boot blocks.

11. A computer program product as defined in claims 9 or 10 wherein the replaced stored program instructions are comprised of one or more configuration parameters.

12. A computer program product defined in claim 11 wherein said configuration parameters comprise telephone communication parameters for enabling the client system to communicate with a server system.

13. In a networked computer system which includes a plurality of server systems each of which is connected to a network infrastructure which provides access through said servers to a plurality of sites, and the networked computer system including at least one client system which is connected either directly or logically to one or more of said servers, and each client system comprising a conventional television monitor on which to display information retrieved from of an accessed site, and an electronic unit including program instructions stored in any combination of a mask ROM, RAM, flash memory, mass storage device or CPU memory, and wherein the electronic unit includes a CPU for executing said program instructions so as to control said television monitor in order to provide a user of the client system with a graphical user interface by which the user can access the network infrastructure to browse said sites or otherwise access said network infrastructure, a computer program product for use by at least one of said servers to implement a method for automatically downloading to said CPU of the electronic unit software or data in order to replace or upgrade said program instructions used by the CPU to access the network infrastructure, without the need for user intervention, the computer program product comprising:

a computer readable medium for carrying computer program code means for implementing said method; and said computer program code means comprising:

code means for determining at said at least one server when a client system has been initialized and automatically connected to at the least one of said servers;

code means for automatically and without the need for user intervention, responding to a request from the client system after the client system has automatically checked the validity of the stored program instructions to ascertain the existence of a corrupted state in the stored program instructions of the electronic unit of the client system, and if the validity of the stored program instructions is not verified, then automatically and without the need for user intervention, downloading to said electronic unit a replacement for the program instructions from said at least one of said servers; and code means for automatically and without the need for user intervention, advising said client system of the existence of any upgraded version of the program instructions contained at said at least one server, and if the program instructions of the electronic unit are out of date, then automatically and without the need for user intervention, either (1) replacing the stored program instructions of the electronic unit with the upgraded program instructions downloaded from said at least one of said servers if the upgrade is designated as mandatory at said at least one server, or (2) if the upgrade is not mandatory, prompting the user to decide whether to accept the upgrade from said at least one server.

14. A computer program product as defined in claim 13 wherein the code means for checking the validity of the stored program instructions is comprised of code means for using a conventional checksum technique to verify said validity.

15. A computer program product as defined in claim 13 wherein said program instructions are stored at least in part in boot blocks of the flash memory of the electronic unit, and wherein said code means for replacing the stored program instructions by downloading to said electronic unit a replacement comprises code means for overwriting at least some of said boot blocks.

16. A computer program product as defined in claim 13 wherein said program instructions are stored at least in part in boot blocks of the flash memory of the electronic unit, and wherein said code means for replacing the stored program instructions of the electronic unit with the upgraded program instructions comprises code means for overwriting at least some of said boot blocks.

17. A computer program product as defined in claims 15 or 16 wherein the replaced stored program instructions are comprised of one or more configuration parameters.

18. A computer program product defined in claim 17 wherein said configuration parameters comprise telephone communication parameters for enabling the client system to communicate with a server system.

* * * * *

UNITED STATES PATENT AND TRADEMARK OFFICE
CERTIFICATE OF CORRECTION

PATENT NO. : 5,940,074
DATED : August 17, 1999
INVENTOR(S) : Joe F. Britt, Jr., Andrew T. MCFadden, Phillip Y. Goldman, Bruce A. Leak It is certified that error appears in the above-identified patent and that said Letters Patent is hereby corrected as shown below:

On the title page: Item [56] Reference Cited:

ln. 4: before "2.0" insert --"Administrators Guide, Netscape Proxy Server

Col. 7, ln. 32: after "downloaded" change "form" to --from--

Col. 8, ln. 51: after "illustrates a" change "portions" to --portion--

Col. 9. ln. 3: after "script" change "too" to --to--

Col. 11, ln. 8: after "which" and before "are" delete [will]

Col. 12, ln. 51: after "from" and before "an" delete [of]

Col. 13, ln. 60: after "from" and before "an" delete [of]

Col. 15, ln. 18: after "from" and before "an" delete [of]

Col. 15, ln. 39: after "at" and before "least" delete [the]

Signed and Sealed this

Seventh Day of November, 2000

Attest:

Q. TODD DICKINSON

*Attesting Officer*      *Director of Patents and Trademarks*